Sept. 2, 1958   K. G. F. MOELLER   2,849,871
FLEXIBLE NOISE ISOLATING SHAFT COUPLING
Filed Nov. 29, 1955
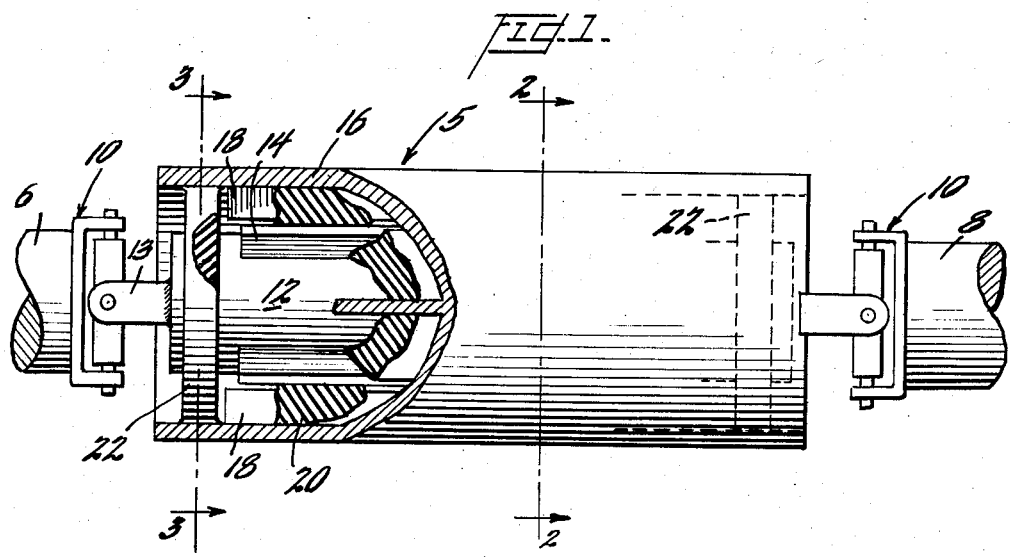
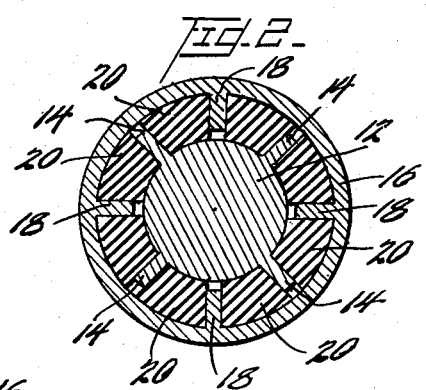
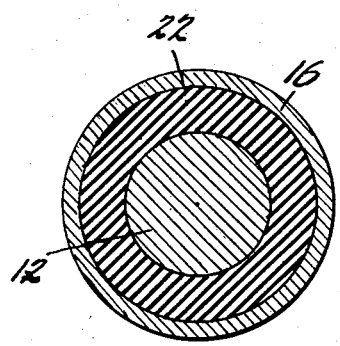
INVENTOR
*Kurt G. F. Moeller,*
BY *George Sipkin*
*B. L. Zangwill*
ATTORNEY

2,849,871

FLEXIBLE NOISE ISOLATING SHAFT COUPLING

Kurt G. F. Moeller, Annapolis, Md., assignor to the United States of America as represented by the Secretary of the Navy Application November 29, 1955, Serial No. 549,894

(Granted under Title 35, U. S. Code (1952), sec. 266)

2 Claims. (Cl. 64—14)

The invention described herein may be manufactured and used by or for the Government of the United States of America for governmental purposes without the payment of any royalties thereon or therefor.

This invention relates to a flexible, noise isolating shaft coupling; and more particularly to a flexible, noise isolating shaft coupling adapted to transmit an extremely high torque.

In the prior art flexible couplings frequently consist of two flanges bolted together with a rubber member sandwiched therebetween, each of the flange members being rigidly connected to a rotatable shaft, such flexible couplings being adapted to compensate for angular displacement between the respective shafts, and also adapted to isolate noise transmission from one shaft to another. The prior art devices of this type are confined primarily to applications where only comparatively low torque is required to be transmitted. With such couplings, when an extremely high torque is encountered, it is necessary to make the rubber portion of the coupling of an enlarged diameter which in turn leads to a coupling member of such large overall dimensions that it becomes comparable in size to the engine or motor to which it is attached. A material increase in the diameter of the coupling also increases the problem of balancing the device. Other prior art devices consist of a hollow shaft having a smaller shaft placed concentrically therein, motion being transmitted from one shaft to the other by placing between such shafts, on the interior of the larger one, a rubber member which is bonded to both shafts. The latter devices will not withstand extremely high torque because said torque is transmitted to the rubber in shear and therefore either the rubber will fail or the bond between the respective shafts and said rubber will fail.

An object of the present invention is to provide a flexible, noise isolating coupling that is capable of transmitting extremely high torque without being unduly large.

A further object is to provide a flexible coupling that may be readily assembled and disassembled.

Still a further object is to provide a flexible coupling that is relatively free of balancing problems.

Other objects and many of the attendant advantages of this invention will be readily appreciated as the same becomes better understood by reference to the following detailed description when considered in connection with the accompanying drawings wherein:

Fig. 1 is a plan view of the present invention showing the flexible coupling partially broken away and in section;

Fig. 2 is a transverse vertical sectional view of the coupling taken on line 2—2 of Fig. 1; and Fig. 3 is a transverse vertical sectional view of the coupling taken on line 3—3 of Fig. 1.

Referring now to the drawings wherein like reference characters designate like or corresponding parts throughout the several views, there is shown in Fig. 1, which illustrates a preferred embodiment, a flexible coupling 5 connected between two shafts 6 and 8. The flexible coupling 5 is connected to each of said shafts by a conventional metallic universal or double gimbal joint 10.

In accordance with the present invention the flexible coupling 5 comprises a round metal rod 12 one end of which has a pair of metallic arms 13 welded thereto which are connected to the joint 10 associated with the metal shaft 6. The rod 12 has on its outer surface a series of outwardly projecting, longitudinally extending metal fins 14 welded thereto. Each fin 14 extends substantially the full length of rod 12. The coupling 5 further comprises a cylindrical metal tube 16 arranged concentrically to surround the rod 12 and being substantially co-extensive in length therewith. The tube 16 has an end provided with a pair of metallic arms connected to the joint 10 associated with the metal shaft 8. The interior surface or wall of the tube 16 is provided with a series of inwardly projecting metal fins 18 welded or otherwise rigidly affixed thereto. Each fin 18 extends substantially the full length of said surface of tube 16, and is substantially the same shape and size as the fins 14 on the rod 12. When the coupling is in assembled form each fin 18 on the inside of the tube 16 is spaced midway between the adjacent fins 14 externally on the rod 12 in the manner shown on Figs. 1 and 2. Each fin 14 is also midway between two adjacent fins 18. Note that the fins terminate slightly away from the member 12 or 16 toward which they extend; so that there is no metallic contact between the rod 12 and tubular member 16.

While the preferred embodiment of the coupling has rod 12, tube 16 and their fins made of metal for high torque transmission, it is pointed out that other suitable materials may be used, such as for example, a hard plastic or the like.

The coupling 5 further comprises a number of elongated, compressible flexible members 20 inserted between adjacent fins 14 and 18, in the space between the outer surface of the rod 12 and the interior surface of the tube 16, in the manner shown in the Figs. 1 and 2. The elongated members or strips 20 are preferably made of rubber or the like, and extend substantially the full length of the coupling between adjacent fins. The compressible members 20 are of a size such that each fits snugly within the space between adjacent fins 14 and 18, so that there is no rotational play between rod 12 and tube 16 until one of them is subjected to a substantial torque.

As a means to keep the rod 12 and tube 16 in concentric relation, and yet allow slight lateral movement of one relative to the other, there is provided a pair of annular discs 22 made of rubber or the like, said discs being flexible and resilient but less flexible than the compressible members 20. One of said annular discs 22 is located at each end of the coupling, surrounding a respective end of the rod 12 and being bonded to both said rod 12 and the tube 16 or in frictional contact only with said members 12 and 16. The use of these discs allows slight axial displacement of the coupling elements without interfering with concentricity and torsional compliance.

In operation, assuming that shaft 6 is the driving shaft and shaft 8 the driven shaft, it is pointed out that rotation of shaft 6 causes rotating of rod 12 through the left hand universal joint 10. This rod 12 becomes a driving member and through fins 14, strips 20, and fins 18 causes the tube 16 to rotate and thus become the driven member, thereby driving the shaft 8 through universal joint 10 at the right of Fig. 1.

Thus it can be seen that motion is transmitted through the coupling by the combined action of the external fins, the rubber strips, and the internal fins. By virtue of the structure set forth above, the rubber used in the coupling takes the torque in compression, rather than in shear.

It is pointed out that flexible, resilient rubber has a greater resistance to failure in compression than in shear, so that the device set forth above is capable of transmitting a considerably larger torque than a conventional flexible coupling in which there are shearing forces on the rubber. Further, since the rubber strips 20 and the fins 14 and 18 are of substantial length they serve to provide a greater area for the torque force to act upon than would be true of conventional flexible couplings previously referred to. Obviously it is desirable to distribute the torque force over as large an area as practical. For a given torque, the elongated coupling of the instant invention has the advantage over one that is enlarged radially so as to absorb said torque, in that said elongated coupling is not subject to as great a vibration and balancing problem as the coupling of an enlarged diameter.

It is further pointed out that the device of the subject invention is particularly adapted to the transmission of a high torque, since only one degree of freedom of movement thereof is required, that is, rotation about its axis; said device not being required to compensate for misaligned shafts to which it is connected.

It is further pointed out that the applicant's device is adapted to be readily disassembled by taking out the annular disc 22 at each end, and then removing the rod 12 from within the tube 16. Upon re-assembly, discs 22 can be put back in place to retain the members in proper concentric relation. In addition it should be noted that the rubber strips 20 between the respective fins are adapted to be readily replaced in the event that undue wear thereof occurs. By virtue of the removability of the rubber strips 20, it is possible to substitute strips having various degrees of resiliency so as to adapt the device for the transmission of various amounts of torque.

While the rubber strips have been disclosed as being removable in the preferred embodiment of the invention, it is pointed out that said rubber strips could be so arranged as to fill the entire space between the rod 12 and tube 16 and be bonded to both of said members, as well as to the fins 14 and 18.

It is also pointed out that at no point is there metallic contact between the inner driving shaft or rod 12 and the outer driven tube or hollow shaft 16. Thus the instant construction is of considerable value in noise reduction.

It is further pointed out that the center portion of the assembly, i. e., the noise isolating device, may be used too in straight shafts where only noise isolation is required and no flexibility in a radial direction is required.

Obviously many modifications and variations of the present invention are possible in the light of the above teachings. It is therefore to be understood that within the scope of the appended claims the invention may be practiced otherwise than as specifically described.

What is claimed is:

1. A flexible coupling and noise isolator comprising an elongated round rod, one end of said rod being adapted to be attached to a first rotatable shaft, an elongated tubular member of a length substantially equal to that of the rod, said tubular member surrounding the rod, a plurality of radially projecting fins rigidly attached to the outer surface of the rod and spaced around the periphery thereof, a like number of inwardly projecting fins rigidly attached to the interior wall of the tubular member and spaced around the surface thereof, respective fins on the rod projecting into the space provided between respective fins on the tubular member, whereby no two fins on either the round rod or the tubular member are directly adjacent one another, and a number of elongated flexible, compressible members in the space between immediately adjacent fins, said elongated compressible members being of a width equal to that of the space between immediately adjacent fins, and a pair of annular rubber discs, one of which is carried at each end of the round rod and is in contact with both the outer surface of the rod and the inner wall of the tubular member.

2. A flexible coupling and noise isolator as set forth in claim 1, wherein the annular discs are bonded to the rod and the tubular member.

References Cited in the file of this patent

UNITED STATES PATENTS

| | | |
|---|---|---|
| 1,671,436 | Melott | May 29, 1928 |
| 1,817,517 | Krotee | Aug. 4, 1931 |
| 2,208,314 | Snyder | July 16, 1940 |
| 2,219,142 | Williams | Oct. 22, 1940 |
| 2,219,144 | Williams | Oct. 22, 1940 |
| 2,337,287 | Williams | Dec. 21, 1943 |

FOREIGN PATENTS

| | | |
|---|---|---|
| 798,315 | France | May 14, 1936 |
| 575,163 | Great Britain | Feb. 6, 1946 |